(12) United States Patent
Myers et al.

(10) Patent No.: US 11,138,307 B2
(45) Date of Patent: Oct. 5, 2021

(54) INDEXABLE AUTHENTICATION SYSTEM AND METHOD

(71) Applicants: Cody Myers, Seattle, WA (US); Meron Myers, Seattle, WA (US)

(72) Inventors: Cody Myers, Seattle, WA (US); Meron Myers, Seattle, WA (US)

( * ) Notice: Subject to any disclaimer, the term of this patent is extended or adjusted under 35 U.S.C. 154(b) by 115 days.

(21) Appl. No.: 16/712,445

(22) Filed: Dec. 12, 2019

(65) Prior Publication Data

US 2020/0117792 A1 Apr. 16, 2020

Related U.S. Application Data

(63) Continuation of application No. 16/406,853, filed on May 8, 2019, now Pat. No. 10,558,794.

(60) Provisional application No. 62/668,909, filed on May 9, 2018.

(51) Int. Cl.
*G06F 21/41* (2013.01)
*H04L 29/06* (2006.01)

(52) U.S. Cl.
CPC ............ *G06F 21/41* (2013.01); *H04L 63/083* (2013.01); *H04L 63/0884* (2013.01); *H04L 63/104* (2013.01)

(58) Field of Classification Search
CPC ... G06F 21/41; H04L 63/083; H04L 63/0884; H04L 63/104
USPC .......................................................... 726/8
See application file for complete search history.

(56) References Cited

U.S. PATENT DOCUMENTS

| 5,774,551 | A | 6/1998 | Wu |
| 7,428,750 | B1 | 9/2008 | Dunn |
| 8,201,217 | B1 | 6/2012 | Begen |
| 8,572,716 | B2 | 10/2013 | Chander |
| 9,053,304 | B2 | 6/2015 | Ronda |
| 9,397,838 | B1* | 7/2016 | Chen ....................... H04L 9/321 |
| 9,712,514 | B2 | 7/2017 | Breiman |
| 9,807,080 | B2 | 10/2017 | Otranen |
| 2006/0094504 | A1* | 5/2006 | Polchin ................... A63F 13/10 |
| | | | 463/36 |
| 2016/0182487 | A1* | 6/2016 | Zhu ........................ H04L 63/083 |
| | | | 726/9 |
| 2016/0255067 | A1* | 9/2016 | Keromytis .............. H04L 9/321 |
| | | | 726/7 |

OTHER PUBLICATIONS

Software Engeneering Stack Exchange, Authentication users across multiple web services, Question answer site, Feb. 26, 2015, 1 page, Softwareengineering.stackexchange.com.

* cited by examiner

Primary Examiner — Peter C Shaw
(74) Attorney, Agent, or Firm — Nyman IP LLC; Scott Nyman

(57) ABSTRACT

An indexable authentication system is provided for authenticating users across multiple sessions. The indexable authentication system may include an authentication server, security component, communication component, credential database, authentication credential, credential index medium, origin terminal, access provisioning component, content filtering component, payment processing component, and provider aspects. A method for authenticating users across multiple sessions using the indexable authentication system is also provided.

19 Claims, 8 Drawing Sheets

INDEXABLE AUTHENTICATION SYSTEM AND METHOD

CROSS-REFERENCE TO RELATED APPLICATION

This application claims the priority from U.S. nonprovisional patent application Ser. No. 16/406,853 filed May 8, 2019, which claims priority to U.S. provisional patent application Ser. No. 62/668,909 filed May 9, 2018. The foregoing applications are incorporated in their entirety herein by reference.

FIELD OF THE INVENTION

The present disclosure relates to an indexable authentication system. More particularly, the disclosure relates to authenticating users across multiple sessions.

BACKGROUND

People have busy lives. It can sometimes be difficult to find time for lunch or keep fit by visiting a gym, let alone keep up with entertainment programming. Some people try to combine tasks to save time, like viewing entertainment while exercising at the gym. However, daytime programming is typically unappealing. Fortunately, many gyms and other establishments provide access to alternative programming by providers such as Netflix, Hulu, Pandora, ESPN, and other providers. Unfortunately, signing into multiple services can be a large hassle for a user trying to multitask viewing entertainment programming and keeping active at a gym or other location.

Additionally, we continually must manage more and more credentials and passwords, account cards, and other forms of identification. For all the services and providers we deal with on a day-to-day basis, accessing each of these credentials, whether it be identification numbers provided on a card, account login information for an online service, or other associations of a user with a provider service, can be cumbersome. The public has long needed a better solution.

In one example, a person may be returning to their home from work and need to stop by a store to pick up supplies for dinner. To complete this transaction, the user may interact with multiple accounts including a rewards account, electronic payment account, and potentially entertainment service provider account such as Pandora to listen to music while shopping. Some existing platforms can store account details for some of a user's credit cards, but users need a common place for logins and account information for provider services, payment methods, rewards cards, physical access, and other authenticatable activities.

However, a completely centralized repository of passwords included on a card or other physical item that can be carried by a user poses a risk for data theft and/or identity theft. Additionally, having all the account information stored on a single physical card limits the ability of a user to control permissions for other people that the user wishes to grant partial access to their accounts.

Another frustration that currently exists that needs a solution is setting up your accounts on a new electronic device such as a media streaming box, game console with multimedia features, or smart TV. A solution is needed that will allow a user to set up multiple accounts substantially simultaneously using one association of the user with his or her accounts. Ideally, this solution would provide persistent login information for many applications, services, accounts, and other features associated with the user. Another notable frustration that currently exists and needs a solution is the independent and disparate nature of associating authentication techniques with an account and remedying that association in the case of a breach. For example, with existing 2-factor authentication ("2FA") systems, a user is required to set up a 2FA or other authenticator with each account. If lost or stolen, that 2FA or other authenticator must be deactivated from each account separately and a new 2FA or other authenticator reactivated and tied to each account separately. Basically, the individual 2FA or other authenticator is tied to each account, vs the account and authentication system account being tied together.

Therefore, a need exists to solve the deficiencies present in the prior art. What is needed is a system to authenticate users across multiple sessions. What is needed is a system to manage authenticated sessions. What is needed is an authentication system with authentication credentials. What is needed is a system with authentication credentials capable of being indexed using physical media and/or virtual media. What is needed is a user-manageable association of authentication indexes referencing authentication credentials that can be associated and/or disassociated with a credential index medium without having to disparately change an authentication with each provider individually. What is needed is a method of authenticating a user including authentication credential management. What is needed is a method of filtering content for authenticated users. What is needed is optional payment processing aspects included by an authentication system. What is needed is an identity verification and authentication with simpler operation and management than existing 2FA operations.

SUMMARY

An aspect of the disclosure advantageously provides a system to authenticate users across multiple sessions. An aspect of the disclosure advantageously provides a system to manage authenticated sessions. An aspect of the disclosure advantageously provides an authentication system with authentication credentials. An aspect of the disclosure advantageously provides a system with authentication credentials capable of being indexed using physical media and/or virtual media. An aspect of this disclosure advantageously provides a user-manageable association of authentication indexes referencing authentication credentials that can be associated and/or disassociated with a credential index medium without having to disparately change an authentication with each provider individually. An aspect of the disclosure advantageously provides a method of authenticating a user including authentication credential management. An aspect of the disclosure advantageously provides a method of filtering content for authenticated users. An aspect of the disclosure advantageously provides optional payment processing aspects included by an authentication system. An aspect of this disclosure advantageously provides an identity verification and authentication with simpler operation and management than existing 2FA operations.

Accordingly, the disclosure may feature an authentication system including an authentication server, credential database, authentication credential, credential index medium, and optionally other features. The authentication servicer may be operated on a computerized device comprising a processor and a storage medium storing instructions operable, when executed by the computerized device, to cause one or more computers to authenticate and determine a scope of permissions relating to an access request for services. The credential database may be communicably connected to the authentication server and have a record relating to a user. The record may include permissions. The authentication credential may be associated with the user and may link at least part of the record for the user with a provider. The credential index medium may facilitate access to the authentication credential via a credential address index. The authentication server may validate the access request by performing the steps including: (a) receiving the access request comprising the credential address index, (b) accessing the record associated with the authentication credential of the user identified by the credential address index in the credential database, (c) comparing the access request with the scope of permissions in the record to determine compliance with a request condition the access request in compliance with the request condition being directed to the provider to determine whether the request will be granted, and (d) returning the authentication credential permitting the access request that is compliant with the request condition and granted by the provider. The authentication credential may be identified from the credential index medium by performing the steps including: (e) accessing the credential address index from the credential index medium at an origin terminal remote to the authentication server, (f) requesting the authentication server to access the authentication credential indicated by the credential address index, (g) validating the access request by the authentication server, and (h) returning the authentication credential indicated by the access request if validated. The scope of permissions in the record may be customizable. The services granted access may be at least partially filterable to comply with the scope of permissions. The credential address index may identify and be distinguishable from the authentication credential.

In another aspect, the authentication server may validate an authorized session with the provider to be indicated by the authentication credential. Upon authenticating the user by the authentication server, the authentication server may validate the user to the provider to access the services provided by the authorized session.

In another aspect, the authentication credential index may be associable with the credential index medium that is eligible for association, such that the authentication credential that is associated is locatable using the credential index medium. The authentication credential index may be disassociable with the credential index medium that is identified for disassociation. Association and disassociation of the authentication credential index with the credential index media may be managed by the user without affecting a state of the authentication credential and authorized session indicated by the authentication credential.

In another aspect, a credential address index may be a pointer to at least the authentication credential.

In another aspect, the record may include the authentication credential.

In another aspect, the user may be associable with sub-users. The scope of permissions may be manipulable for each of the sub-users as definable by the user.

In another aspect, interaction with a physical interface may be includable in the permissions.

In another aspect, entry into a space may be restricted by an electronically-controllable lock is includable in the access request. Access to the space may be includable in the permissions. Unlocking the electronically-controllable lock may be permittable by the authentication credential.

In another aspect, the services subject to the access request may be at least partially filterable to permit the access limited by levels of access. The services may be at least partly limited respective to the levels of access. Features of the services may be independently, selectively permitted or denied as defined by the levels of access within the scope of permissions.

In another aspect, the levels of access may be filterable with regard to at least the following selectively permitted scope of permissions: access to the services, restrictions on content consumable through the services, and timed-exclusions regarding the access to the services.

In another aspect, the system may additionally include a rewards component to track activity and determine incentives for engaging with the authentication server and/or the services, such as may be associated with the authenticated services, that are compliant with the request condition.

In another aspect, the credential index medium may be providable as a tangible object.

In another aspect, the credential index medium may be providable as a virtual card carried electronically.

In another aspect, the credential address index may be includable with multiple credential index media substantially simultaneously.

According to an embodiment of this disclosure, an authentication system may be provided including an authentication server, credential database, authentication credential, credential index medium, and optionally other components. The authentication server may be operated on a computerized device comprising a processor and a storage medium storing instructions operable, when executed by the computerized device, to cause one or more computers to authenticate and determine a scope of permissions relating to an access request for services. The credential database may be communicably connected to the authentication server having a record relating to a user. The record may include permissions. The authentication credential may be associated with the user and link at least part of the record for the user with a provider. The credential index medium may facilitate access to the authentication credential via a credential address index. The authentication server may validate the access request by performing the steps comprising: (a) receiving the access request including the credential address index from the provider, (b) accessing the record associated with the authentication credential of the user identified by the credential address index in the credential database, (c) comparing the access request with the scope of permissions in the record to determine compliance with a request condition, the access request in compliance with the request condition being directed to the provider to determine whether the request will be granted, and (d) returning the authentication credential permitting the access request that is compliant with the request condition and granted by the provider. The authentication credential may be identified from the credential index medium by performing the steps comprising: (e) accessing the credential address index from the credential index medium at an origin terminal remote to the authentication server, (f) requesting the authentication server to access the authentication credential indicated by the credential address index, (g) validating the access request by the authentication server, and (h) returning the authentication credential indicated by the access request if available to the provider. The authentication server may maintain an authorized session with the provider to be indicated by the authentication credential. Upon authenticating the user by the authentication server, the authentication server may validate the user to the provider to access the services provided by the authorized session that is maintained. The authentication credential index may be associable with the credential index medium that is eligible for association, such that the authentication credential that is associated may be locatable using the credential index medium. The authentication credential index may be disassociable with the credential index medium that is identified for disassociation. Association and disassociation of the authentication credential index with credential index media may be managed by the user without affecting a state of the authentication credential and authorized session indicated by the authentication credential. The scope of permissions in the record may be customizable. The credential address index may identify and be distinguishable from the authentication credential.

In another aspect, the services granted access may be at least partially filterable to comply with the scope of permissions. The services subject to the access request may be at least partially filterable to permit the access limited by levels of access. The services may be at least partly limited respective to the levels of access. Features of the services may be independently, selectively permitted or denied as defined by the levels of access within the scope of permissions.

According to an embodiment of this disclosure, a method may be provided for authenticating a session. The method may include (a) determining a scope of permissions to authenticate an access request for services using an authentication server. The method may include (b) accessing a record relating to a user from a credential database communicably connected to the authentication server, the record comprising permissions. The method may include (c) managing an authentication credential associated with the user and linking at least part of the record for the user with a provider. The method may include (d) facilitating access to the authentication credential via a credential address index provided by a credential index medium. The method may include (e) validating the access request via the authentication server by performing the steps including: (i) receiving the access request comprising the credential address index, (ii) accessing the record associated with the authentication credential of the user identified by the credential address index in the credential database, (iii) comparing the access request with the scope of permissions in the record to determine compliance with a request condition, the access request in compliance with the request condition being directed to the provider to determine whether the request will be granted, and (iv) returning the authentication credential permitting the access request that is compliant with the request condition and granted by the provider. The method may include (f) identifying the authentication credential from the credential index medium by performing the steps including: (i) accessing the credential address index from the credential index medium at an origin terminal remote to the authentication server, (ii) requesting the authentication server to access the authentication credential indicated by the credential address index, (iii) validating the access request by the authentication server, and (iv) returning the authentication credential indicated by the access request if validated. The scope of permissions in the record may be customizable. The services granted access may be at least partially filterable to comply with the scope of permissions. The credential address index may identify and be distinguishable from the authentication credential.

In another aspect, the authentication server may validate an authorized session with the provider to be indicated by the authentication credential. Upon authenticating the user by the authentication server, the authentication server may validate the user to the provider to access the services provided by the authorized session. The method may further include (g) associating the authentication credential index with the credential index medium that is eligible for association, such that the authentication credential that is associated is locatable using the credential index medium. The method may include (h) disassociating the authentication credential index with the credential index medium that is identified for disassociation. Association and disassociation of the authentication credential index with credential index media may be managed by the user without affecting a state of the authentication credential and authorized session indicated by the authentication credential.

In another aspect, the method may include (i) at least partially filtering the services subject to the access request to permit the access limited by levels of access, wherein the services are at least partly limited respective to the levels of access. The method may include (j) independently, selectively permitting or denying features of the services as defined by the levels of access within the scope of permissions.

In another aspect, the credential address index may be associable with multiple credential index media substantially simultaneously.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

DETAILED DESCRIPTION

Figure 1:
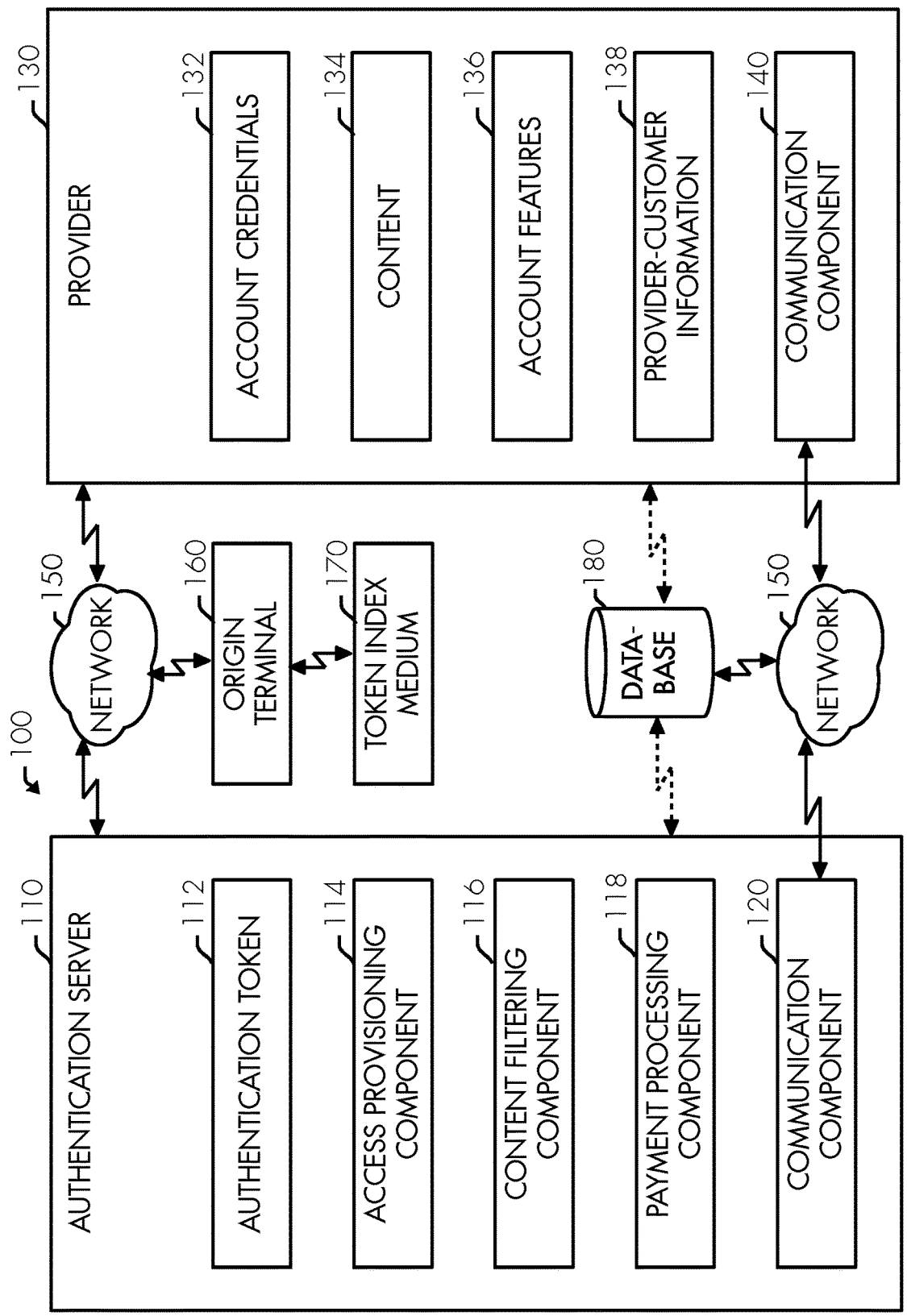
FIG. 1 is a block diagram view of an illustrative authentication system, according to an embodiment of this disclosure.

The following disclosure is provided to describe various embodiments of an indexable authentication system. Skilled artisans will appreciate additional embodiments and uses of the present invention that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

Various aspects of the present disclosure will now be described in detail, without limitation. In the following disclosure, an indexable authentication system will be discussed. Those of skill in the art will appreciate alternative labeling of the indexable authentication system as a digital authentication system, permission system, session management platform, the invention, or other similar names. Similarly, those of skill in the art will appreciate alternative labeling of the indexable authentication system as a user authentication technique, access provisioning method, permission determination and access control operation, method, operation, the invention, or other similar names. Skilled readers should not view the inclusion of any alternative labels as limiting in any way.

For the purpose of this disclosure, the term index is defined as a list of data, such as group of files or database entries. An index may be saved in a plain text format that can be quickly scanned by a search algorithm, such as one that may be operated by an authentication server. Searching via one or more index may significantly expedite searching and sorting operations on indexed data. Indexes may additionally include information about one or more item in a list and may include data, metadata, keywords, and other information that would be apparent to a person of skill in the art after having the benefit of this disclosure. By using an index, the authentication server and other aspects described through this disclosure may advantageously search via the index instead of reading the contents and identification of each file individually.

For the purpose of this disclosure, the term credential is defined as information or tools to facilitate authentication and/or verification of identity. Credentials may be related to a certificate or other authentication process used to confirm a user identity, for example, as it may relate to a network address or provider user account. In some embodiments, credentials may be digital objects including information about a user to prove identity and thus assist with satisfying a request condition, such as permission to access a service, in an access request to a provider.

For the purpose of this disclosure, the term token is defined as an identification credential and/or identification code that may be used to log into a network or access a system. For example, tokens may be provided as soft tokens, or electronic code used to selectively give access for authorized users to secure locations or computer systems and/or revoke access. Tokens may also be referred to as virtual tokens, since they may operate as a virtual version of hardware keys and other physical security devices. To add an extra measure of security, a soft token authentication may also require a username and password to make sure the correct user is using the authorized service and/or device. In some embodiments, a token may include a credential. While embodiments discussed throughout this disclosure may focus on use of soft tokens, those of skill in the art will appreciate additional applications that could benefit from including and/or using hard tokens to facilitate authentication.

For the purpose of this disclosure, the term database is defined as a data structure that stores organized information. A database may include multiple records, which may include several different fields. The fields and records may be organized in tables in the database. A database may be relational, as will be understood by those of skill in the art, allowing the database to permit access, updates, and search of information based at least in part on the relationship of data stored across various records, tables, and other structures of the database. Relational databases may also provide queries that access multiple databases.

For the purpose of this disclosure, the term record is defined to include an entry in a database that may include one or more values. Groups of records may be stored in a table, which may define types of data each record may contain. Databases may contain multiple tables, which may each contain multiple records. Records may advantageously provide flexibility in storage and access for data, as a record may include multiple data types. For example, a single record may include many different types of information, such as and without limitation, name, birthdate, photo, authentication credentials, tokens, permissions, limitations, account associations, payment information, preferences, assigned credential media, identifications of associated physical devices and media, and other information of similar or different data types that would be appreciated by a person of skill in the art after having the benefit of this disclosure. One or more of these fields may be easily accessed or compared with other records, for example, using a database query. Records may advantageously be created, modified, and/or deleted without affecting other data in a database.

For the purpose of this disclosure, the term pointer is defined as a reference that stores the memory address of another value located in computer memory. A pointer may reference a location in memory, for example as retrieved from a database such as a credential database, and obtain the value stored at that location. In this disclosure, a pointer may be designed to identify a single datum or a collection of data, which may or may not be store continuously in memory and/or data storage. Pointers may be absolute by referencing a specific memory and/or database location, and/or relative by referencing an offset from a base memory and/or database start address. Verbs such as point, pointing, pointed, and other derivatives may be used throughout this disclosure to describe a memory address indicated by a pointer, such as may be used by a credential index.

Referring now to FIGS. 1-9, the indexable authentication system will now be discussed in more detail. The indexable authentication system 100 may include an authentication server 110, security component, communication component 120, 140, credential database 180, authentication credential 112, credential index medium 170, origin terminal 160, access provisioning component 114, content filtering component 116, payment processing component 118, provider aspects 130, and additional components that will be discussed in greater detail below. The indexable authentication system 100 may operate one or more of these components interactively with other components for authenticating users across multiple sessions.

In one embodiment, an authentication server 110 may include an authentication credential 112 to provide access for a requesting user to an authenticated session. The authentication server 110 may additionally include an access provisioning component 114, content filtering component 116, payment processing component 118, and/or authentication server communication component 120, each of which may be discussed below in more detail. The provider 130 may include account credentials 132 for a user, content 134 to be consumed by a user, account features 136 permitted for a user, provider-customer information 138, and a provider communication component 140.

The authentication server 110 and the provider 130 may be communicably connected via a network 150. In one example, the authentication server communication component 120 of the authentication server 110 and the provider communication component 140 of the provider 130 may be communicably connected via a network 150. Although multiple network icons are shown in FIG. 1 and labeled as network 150, skilled readers will appreciate that these icons can collectively represent a unified network in some embodiments.

An origin terminal 160 may additionally be communicably connected to the network 150 to request access, receive content 134 and permissions, and otherwise communicate with the other components of the authentication system 100. A credential index medium 170 may be provided by a user to interface with the origin terminal 160, which may be used to request a permission or access to a session. Additionally, information relating to a user may be stored as a record on a credential database 180, which may communicably connect to the network 150 such that it may communicate with at least the authentication server 110, origin terminal 160, and/or provider 130.

The authentication server will now be discussed in greater detail. FIGS. 1-2, 4, and 6-8 highlight examples of the authentication server, which may also be shown in other figures. The authentication server 110 may connect with a provider 130 directly, over a network, or otherwise. In some embodiments, the authentication server 110 may connect with the origin terminal 160. The origin terminal 160 may be configured to receive and/or access information from one or more credential index medium 170. The credential index medium 170 may direct a request for access to an authenticated session, such as may be provided by an authentication credential 112 associated with the user, to determine whether the request should be granted. The request may be directed to the provider 130 to authenticate the request, the results of which may be provided to the origin terminal 160. In another embodiment, the authentication server 110 may additionally connect with the database 180, the network 150, via direct connection, or otherwise.

An authentication server 110 may be communicatively connected to a provider system 130 over the network 150. The provider 130 may include information about the user and their account. This information may include, for example, account credentials 132, subscription level, provider content 134, account features 136, custom information for the provider 138, and other information that may be associated with the user.

In practice, a system with features described by this disclosure may generally authenticate users across multiple services (such as Netflix, Amazon, HBO, Spotify, Comcast, Uber, etc.), manage authenticated sessions, manage credentials (logins, reward accounts, etc.), and control permissions for authenticated sessions. This disclosure may include a provider 130 to authenticate a requested session. This disclosure may additionally include an authentication server 110 to authenticate a session for a third-party provider service, a credential index medium 170 to provide customizable access to an authentication credential 112, access provisioning via an access provisioning component 114, content filtering via content filtering component 116, and optionally payment processing via a payment processing component 118.

The authentication server 110 may receive access requests to authenticate a user for access to a provider 130, such as a third-party service. These access requests may be received by the authentication server 110 from the provider 130. The access request may be initiated from an origin terminal 160 interfacing with the provider 130. The provider 130 may communicate with the authentication server 110 to authenticate the access request it received from the origin terminal 160. The authentication server 110 may compare information received with the access request to authenticate a user and confirm identity to the provider 130. For example, the authentication server 110 may compare information stored in the credential database 180 with the access request from the provider 130 to determine whether the compared information complies with a request condition, such as having an acceptable level of correlation. If compliance with the request condition is determined, for example by having sufficient correlation, the authentication server 110 may return an authentication credential 112 to the provider 130, which may permit access to the user having been authenticated. An authenticated user may then be provided access to the session, for example, access to desired content 134 from the provider 130.

An illustrative security component and related operation, which may be operated by the authentication server or another component, will now be discussed in greater detail. A security component may optionally be included to manage and/or enhance security of authenticated sessions, process access requests for authenticated sessions, manage authentication credentials, and/or other activity relating to access of an account associated with the user. For example, the security component may enable two-factor verifications for access to a provider 130 or a session through the system. The security component may additionally provide tools to remotely deactivate, freeze, reactivate, or otherwise control access associated with a credential address index to the authentication credential 112.

The security component may include a timer feature. Sessions could be set to expire when the limit set by the timer elapses. Timer limits may be fixed, dynamically controlled, or otherwise determined. These control tools may be especially beneficial in the case of lost or stolen credential index media 170.

The security component may provide various PINs, codes, and verifications for various devices, such as devices including or operating as a provider 130 and/or an origin terminal 160. This may be especially helpful for authenticated sessions on devices lacking sufficient techniques for inputting the required codes, such as media player devices that use remotes without number buttons. Two-factor verification may also be used with a text message, email, or app associated with the components of this disclosure. Additionally, in some embodiments, the authentication server 110 may provide features to authenticate a user as a substitute or compliment to traditional two-factor authentication ("2FA") techniques. In these embodiments, the 2FA operability may be provided in addition to the rest of the functionality described in the examples given throughout this disclosure.

The security component may automatically log a user out after a definable duration has expired. Such duration may be defined by a provider, user, or other party as a set limit, dynamic window, or otherwise definable term. Additionally, a session may be terminated when the credential index medium associated with the authenticated session is removed from the origin terminal, unavailable to refresh the authenticated session, a new credential index medium is detected by the origin terminal, or another indication that the user authenticated for the session is no longer using the authenticated session.

As discussed above, use of the authentication credential 112 advantageously provides a substantially secure authentication of the user for a requested session or commercial transaction for a provider 130. For example, in one embodiment, some user credentials 132 such as a password are not included by the authentication credential 112. In this embodiment, the authentication server 110 works with the provider 130 to validate that the user is authenticated for sessions with the provider 130 without having to store password information for that user on the authentication server 110 or a communicably connected credentials database 180. This advantageously reduces the likelihood of a nefarious party gaining access to all the accounts of a user if they were to hack one or more of the databases. An identity thief cannot steal what is not there. Accessing accounts can be more secure as limited or no password or user information is input into the origin terminal 160. Additionally, to assist with capturing would-be identity thieves, location data associated with a request for an authenticated session may be recorded, logged, and/or otherwise analyzed, for example, to detect suspicious behavior.

The communication components will now be discussed in greater detail. FIG. 1 highlights examples of the communication component, which may also be shown in other figures. For the purpose of this disclosure, the term communication component may include the authentication server communication component 120, the provider communication component 140, and/or additional components used for communication, as will be appreciated by those of skill in the art. The communication component 120, 140 may share information by transmitting and receiving data over an established communication channel. If no communication channel has yet been established, one or more communication components 120, 140 may attempt to establish such a channel. The communication component may be connected directly to another communication component, be connected over a shared network such as the Internet, be connected over an Intranet, be connected over a virtual private network, be tunneled through an existing network, connect wirelessly, or otherwise connect as will be appreciated by a person of skill in the art. Examples of computerized devices and/or systems that may be used to communicate data and information will be discussed in greater detail below a long with a discussion of FIG. 5.

One or more networks 150 may be provided for the components of the indexable authentication system 110 to communicate with one another. For example, the authentication server 110 may communicate with the provider 130 over a network 150. The authentication server 110 may additionally communicate with the database 180 over the network 150. Those of skill in the art will appreciate that physical connections between the authentication server 110, the provider 130, the origin terminal 160, and/or the database 180 may be provided, without limitation. The authentication server 110 may additionally communicate with the system managed by a provider 130 over a network. Various communications between components of the indexable authentication system 100 may communicate over a common network, individual networks, virtual private networks, or other structures or organizations that would be appreciated by a person of skill in the art after having the benefit of this disclosure. In at least one embodiment, authentication of a user allows the provider to permit access to the content the provider delivers and/or services the provider offers.

The credential database will now be discussed in greater detail. FIG. 1 highlights examples of the credential database, which may also be shown in other figures. The credential database 180 may be included as part of a larger database, provided as an independent database, or otherwise. The credential database 180 may be directly connected to the authentication server 110, connected to the authentication server 110 over a network 150, indirectly connected to the authentication server 110, or otherwise connectable to the authentication server 110, without limitation.

The credential database 180 may be included to store information relating to the user, authentication credentials 112, credentials 132, interaction with the system, and other information. The credential database 180 may be included by the database to store information relating to the users' access to content source by a provider. In some embodiments, the credential database 180 may be independent from an additional database and store information that may not exist on the other databases. Additionally, information may be duplicated between multiple databases for ease of access, backup purposes, redundancy, or other reasons that would be apparent to a person of skill in the art.

In one embodiment, at least part of the credential database 180 may be included by the authentication server 110. Information stored by the credential database 180 may be locally copied to a hard drive or other storage media associated with the authentication server 110. In another embodiment, information stored by the credential database 180 may be provided through a network connection. In this embodiment, at least part of the credential database 180 may be stored on a remote server. Optionally, the credential database 180 may include information on part of common storage media, which may be securely restricted from other portions of the storage media that may be accessed for other purposes. In some embodiments, at least part of the information included by the credential database 180 may be encrypted.

The authentication credential will now be discussed in greater detail. FIGS. 1-2 and 7-9 highlight examples of the authentication credential, which may also be shown in other figures. An authentication credential 112 may include information relating to the credentials 132 of a user to access one or more aspects of the services offered by a provider 130 via a session.

In a first example, a provider 130 may offer access to entertainment media. The authentication credential 112 may include information relating to login credentials, subscription levels, content restrictions, content upgrades, streaming quality levels, and/or other information. In another example for a provider that offers financial transactions, the authentication credential 112 may include account information, statement of available funds, spending restrictions, transaction limitations, payment methods, and other information that may relate to completing a commercial transaction. In yet another example that relates to physical access to a location, the authentication credential 112 may include information relating to a key code, access code, duration of permitted access, restrictions on access, and/or an identifier for logging access.

One or more piece of information may be associated with the authentication credential 112 and stored in the credential database 180. Alternatively, one or more piece of the information may be associated with an authentication credential 112 and stored on a database managed by the provider 130. In another example, at least part of the data on one credential database 180 may be duplicated on another database.

One or more piece of information associated with an authentication credential 112 may be partitioned, controlled, separated, or otherwise associated with a requested session and/or transaction. For example, an access request for an authenticated session may be associated with the requesting party. This access request may limit the extent to which access may be provided to the requesting party as defined by a scope of permissions associated with that requesting party, which may be included in a request condition. Control of permissions will be discussed in more detail along with discussion of the access provisioning component 114.

The authentication credential 112 may be provided in multiple forms. The authentication credential 112 may identify permissions associated with the user, a user's group, privileges for the group, or scope of permissions specific to a provider 130. The provider 130 may use at least some of this information to decide if access should be granted within the request condition and, if so, to what scope. In one example, the authentication credential 112 may be provided as an access token with security credentials for a login session.

The authentication credential 112 may include multiple fields. For example, the authentication credential 112 may include an identifier, a list of privileges, a default owner, and other fields that would be appreciated by persons of skill in the art after having the benefit of this disclosure. One or more of these fields may include sub fields. For example, the identifier field may additionally include information about an associated login session, the user identifier, an identifier about a group associated with the user, restrictions for the user and/or members of the group associated with the user, and/or other information that could be used as an identifier for the user or requested session associated with the user.

Authentication credentials 112 may be generated by the authentication server 110 or another server, which may run security software. Authentication credentials may be associated with a user, such as by being associated with a user in the credentials database 180. Authentication credentials 112 may additionally be accessed via a credential address index, which may point to the address of an authentication credential 112 in a credential database 180 and/or other database.

This credential address indexing advantageously reduces and/or eliminates the need to store authentication credentials 112 locally on physical media or user devices, such as cell phones, PDAs, and laptops. Once permissions associated with the authentication credential 112 is received by the device, a user may be permitted to use a service and/or device within a secure network or can gain access to the server as an authorized user.

Figure 3:
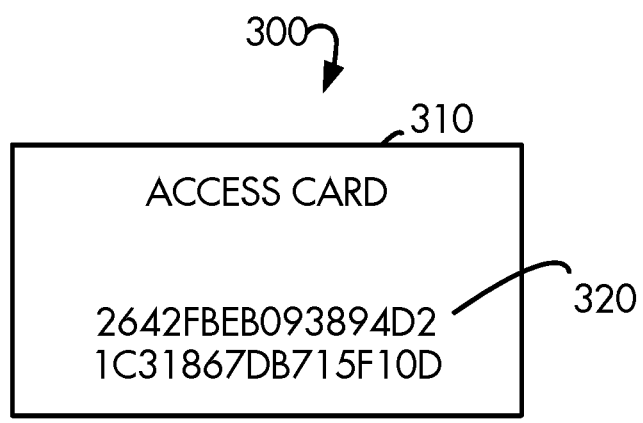
FIG. 3 is a top plan view of an illustrative physical credential index medium, according to an embodiment of this disclosure.

The credential index medium will now be discussed in greater detail. FIGS. 1 and 3 highlight examples of the credential index medium, which may also be shown in other figures. Credential index media 170 may be physical and/or virtual objects that include at least one index to an authentication credential 112 or credentials associated with an authentication credential 112. In some embodiments, credentials may be included by an authentication token, without limitation.

A credential address index may be included by the credential index medium 170 with data that points to the location of the desired authentication credential 112. In one example, the credential address index may be a pointer to a value stored by and retrievable from an authentication credential 112. In this example, the credential address index may reference a location at which the authentication credential 112 is stored.

By including a credential address index to access authentication data stored by and accessible from the authentication credential 112, and not locally storing the authentication credentials, an indexable authentication system 100 advantageously allows for a user to access and reference credentials associated with an authentication credential 112 without exposing the contents of the authentication credential 112 to an unintended party. For example, if a credential index medium 170 is lost and/or stolen, the user can simply break the link between the credential address index and the authentication credential 112 pointed to by the credential address index. This feature allows a user to advantageously limit access to unintended parties without having to reset credentials for each account that would otherwise have been compromised if the login credentials were included on the media.

As mentioned above, the user and customizable permissions may be associated with an authentication credential 112, which may be accessed through an indexed link or custom address. A credential index medium 170, such as a card, FOB, physical item, or virtual item, may include an indexed link, such as a credential address index, pointing to the authentication credential 112 that may be managed by the authentication server 110. For example, a user may be provided with a card including a credential address index or address pointing to information held by the credential database 180 and/or managed by the authentication server 112. The user may swipe (magnetic strip, bar code, etc.), insert (smart chip, etc.), or tap (NFC, RFID, etc.) the card or other media to an access origin terminal 130 or pair (Bluetooth, WiFi, etc.) with a pairing interface to associate the requested session with the user making the access request to authenticate the session.

The provider 130 offering the session may communicate with the authentication server 110 regarding the indexed user and request information from the authentication credential 112 so that the user may be authenticated. This request may include a handshake to ensure integrity of the data included by the access request.

If the authentication server 110 verifies the user is correctly associated with the authentication credential 112, the authentication server 110 and/or the provider 130 may determine whether the user should be permitted access to a session. If it is determined that the user should be permitted access, the session may be permitted. The session may terminate upon removal or unpairing of the card or credential index medium 170. The session may also optionally expire. Since the card or other media merely points to information and permissions and does not locally store credentials, the risk of granting undesired access to a user's content and accounts is greatly reduced. In one embodiment, for some sessions, a supplemental authentication may be required, for example, PIN entry, 2-factor authentication, or confirmation in a companion app.

Figure 5:
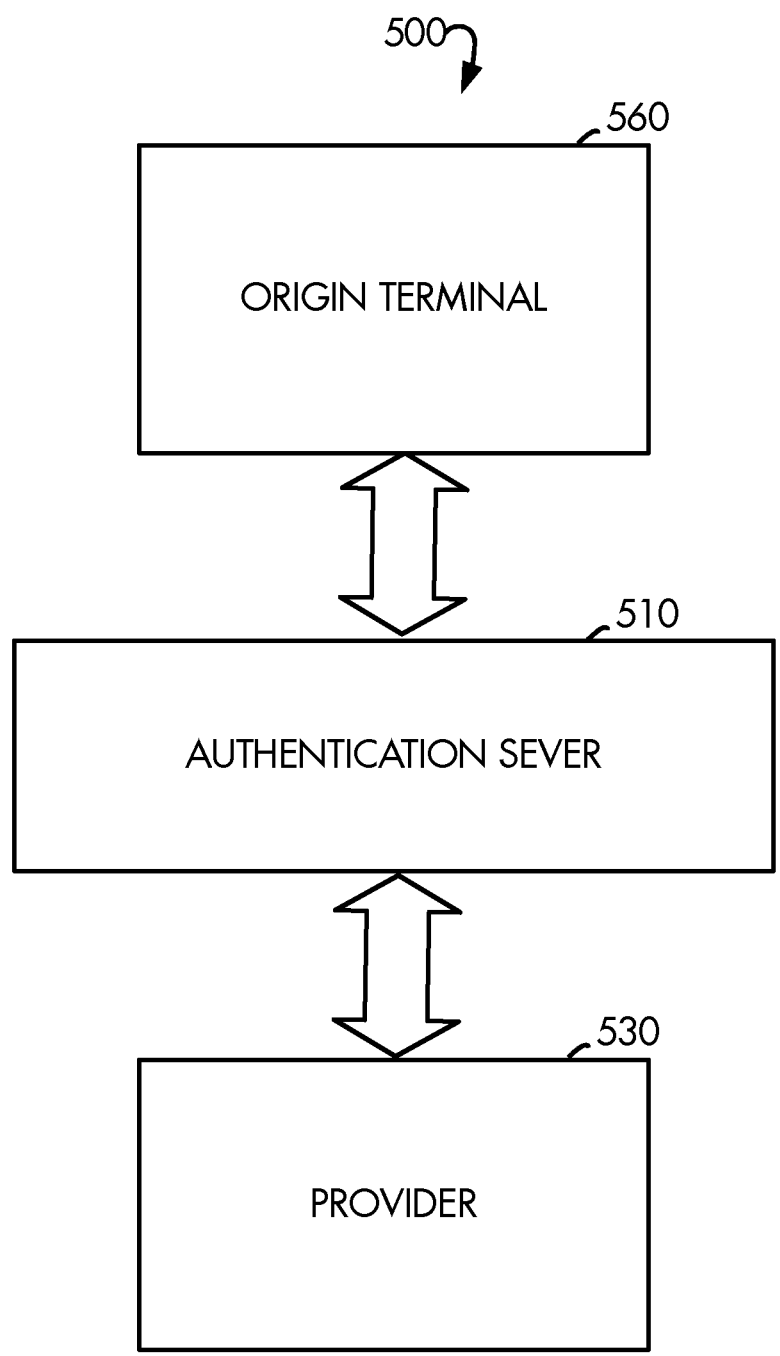
FIG. 5 is a block diagram view of a simplified authentication operation, according to an embodiment of this disclosure.

The origin terminal will now be discussed in greater detail. FIGS. 1 and 5 highlight examples of the origin terminal, which may also be shown in other figures. The origin terminal 160 may receive and/or interface with the credential index media 170. For example, the user may locate their credential index medium 170 near the origin terminal 160 to request authentication for a session with the provider 130. In a more specific example provided without limitation, a user with a card-based credential index medium 170 may insert the card into the origin terminal 160 to request access to a video streaming platform. The origin terminal 160 may read the credential address index from the credential index medium 170 and initiate an access request to the provider 130 to access the content in a session. The provider 130 may communicate with authentication server 110 for information from the authentication credential 112 associated with the credential address index.

This information may be used by the authentication server 110 and/or provider 130 to determine whether to grant an authorized session. The authentication server 110 may communicate with the provider 130 to authenticate the requested session. If the requested session can be authenticated with the request condition, the content requested may be delivered to the user. In an example where the content is audio/visual media, the content may be viewed by a screen and/or speaker communicably connected to or provided by the origin terminal 160. In an example where the requested session is a completion of a commercial transaction, the origin terminal 160 may validate the transaction and allow processing of payment for the connected service.

The origin terminal 160 may be provided as an independent physical object, a connected component to another object, a virtual component included by another system, a software interface operated by another device, or otherwise provided to interface with a credential index medium to facilitate authentication of a requested session. The origin terminal 160 may include a device to retrieve the credential address index from credential index media 170. For example, the origin terminal 160 may include an optical scanner, electronic chip reader, barcode scanner, optical character recognition device, keypad for manual entry, radio, or other communication interface capable of receiving information from credential index media 170 that may assist in identifying a requesting user and/or associated permissions for that user.

The access provisioning component will now be discussed in greater detail. FIG. 1 highlight examples of the access provisioning component, which may also be shown in other figures. The access provisioning component 114 may advantageously allow a user to control which accounts for which providers our accessible to various sub-users that the user wishes to share access with. Access may be provisioned by using permissions that may be associated with a credential address index assigned to a credential index medium 170. The user may advantageously manage permissions associated with a credential address index remotely, avoiding the need to change permissions in each account for sub-users every time the user wishes to make a change.

The user may associate multiple credential index media 170 with their account, which may be especially beneficial in family and/or organizational settings. In an example of access provisioning, the user may permit access to Netflix, Spotify, and HBO for sub-user1, but access to Netflix and Spotify only to sub-user2.

Additionally, in one optional embodiment, the user may filter content per credential index medium 170 using the content filtering component 116. While the content filtering component is shown as included by the authentication server 110 in FIG. 1, additional embodiments can include the content filtering component in one or more provider 130 communicably connected to the authentication server 110. For example, the content filtering component may designate to Netflix to provide full access to sub-user1 but providing Netflix access to content only rated 13 and under to sub-user2. In this example, Netflix as the provider 130 may perform the filtering of allowable content. In another example, the user may share access to a video game console with an online storefront to sub-user1 and sub-user2 but restrict the ability to make purchases on the video game console for only sub-user1 and not sub-user2. In this example, the primary user may additionally set purchase limits on a per-sub-user basis and/or limit authentication of a payment method that would be used to complete the purchase.

Some additional examples of access provisioning will be provided in the context of commercial transactions. In one example, a primary user may distribute token access media 170 to their spouse and child as sub-users. The credential index media 170 may include authentication to pay for goods and services with an associated credit card or other financial instrument. The primary user may provide their spouse sub-user with an unlimited purchasing power but may place restrictions on the purchasing power for their child sub-user. These restrictions may include monetary restrictions, stores, characterization of goods or services purchased, location restrictions, and/or other restrictions that would be appreciated by persons of skill in the art after having the benefit of this disclosure. The authentication server may detect and/or log transaction history by amount, vendor, category, location, time, or otherwise and apply conditional logic to determine whether to grant future authentication requests for the sub-user regarding a payment method.

The content filtering component will now be discussed in greater detail. FIG. 1 highlight examples of the content filtering component, which may also be shown in other figures. Skilled artisans will appreciate additional embodiments wherein the content filtering component is included in one or more provider 130 instead of the authentication server 110, without limitation. The content filtering component may assist with controlling access to aspects of authorized content associated with the permissions for a requesting user. These permissions may be associated with an index included by the credential index medium for the requesting user. For example, a requesting user may be authenticated to access an audio/visual content delivery platform with a subscription that allows access to virtually all content. However, the availability of content provided to the requesting user may be filtered to a subset of the total available content by use of permissions controlled through the content filtering component. In this example, the primary user may be able to access the content provided by the audio/visual content delivery platform using their credential index medium, but the other requesting user may only be permitted to access a subset of the total content authorized.

The payment processing component will now be discussed in greater detail. FIG. 1 highlights examples of the payment processing component, which may also be shown in other figures. Aspects relating to revenue generation will also be discussed. Optionally, a payment processing component 118 may be included to assist with processing payments through the indexable authentication system 100. If included, the payment processing component 118 may operate independently and/or in cooperation with services of providers also facilitating payments or processing of commercial transactions.

In one example, the payment processing component 118 may assist with processing subscription payments to use the authentication server 112 and/or a component associated with the indexable authentication system 100 enabled by this disclosure. In another example, the payment processing component 118 may assist with processing payment for services and platforms associated with the indexable authentication system 100 enabled by this disclosure. In this example, the payment processing component 118 may operate cooperatively with a provider 130 that processes financial transactions and/or independently of such providers.

The payment processing component 118 may include a front-end aspect and a backend aspect. The front-end aspect may connect with various financial institutions, credit card companies, banks, and other settlement services to process a financial transaction. The back-end aspects may process such settlements from the front-end aspects for example by moving money for issuing banks to a merchant bank. Additional aspects may be included by the payment processing component 118 that will be appreciated by persons of skill in the art after having the benefit of this disclosure.

To reduce the risk of unwanted or accidental purchases, supplemental authentication features may be associated with processing of payments (PIN, last 4 of credit card number, etc.). In one example, an authentication system enabled by this disclosure could provide supplemental authentication. Another optional feature could include integrating reward cards, membership cards, physical access cards (electronic keys, public lockers, hotel rooms, other locations accessible through Internet-of-Things, etc.)

Optionally, a revenue generation aspect may be included to monetize use of one or more components of this disclosure. The revenue generation aspect may include instructions for payments to access the authentication services described throughout this disclosure. For example, a revenue generation aspect may manage subscriptions by users of the indexable authentication system, purchases made through the payment processing component 118, if included, or another aspect relating to processing of financial transactions.

Users may find subscription to such a service advantageous due to simplifying authentication of requested sessions, ease of use, convenience, security, control permissions, ease of setup, and other benefits that would be apparent to a person of skill in the art after having the benefit of this disclosure. For example, a user may simply place a card-based credential index medium on a reader at an origin terminal and access their accounts at the places they frequently visit. A user may easily switch between accounts in the middle of their workout. Additionally, a user may not need to bring an external device, such as a tablet, for access to media the user subscribes to. Furthermore, the user may enjoy more control over content accessible by their children.

Subscriptions may be structured monthly, annually, or otherwise. The user may be charged to receive the credential index medium 170. Alternatively, the subscriber may be provided with a card or other credential index media 170 at no extra cost. Replacement cards may be provided free of charge or with an associated replacement fee. Designer cards may be offered, for which a premium may be charged. Short term sessions may be offered, for example, sessions build hourly.

In another example of the revenue generation aspect, revenue may be generated from the providers associated with the authentication service of this disclosure. In this example, the ease of use and confidence of authenticated sessions provided by this disclosure may increase subscribers to the associated providers, reduce back-end processing and server demands for the provider, and increase confidence that users of the provider services are paying subscribers and not accessing the service through another person's credentials, which may be in violation of the providers terms of service or other licensing terms.

In another example, the revenue generation aspect may pay a royalty to one or more of the providers for which an authenticated session is requested. Alternatively, the provider may pay a royalty to the operator of the indexable authentication system 100 for which an authenticated session is requested and/or authenticated. Profits may be split, or royalties may be paid, as may be included in terms between the operator of the authentication server 110 and a provider 130.

Some additional model use scenarios will now be discussed, without limitation. The authentication credential 112 may authenticate sessions for travel, for example, on an airplane. The authentication credential 112 may authenticate sessions for staying in a hotel room. In these examples, after a long day of flying, a traveler may settle into a hotel using the same authentication credential 112 associated with the user's credential index medium 170. While traveling, the user may also purchase a movie, snack, blanket, and/or other desired comfort through transactions authenticated using the authentication credential 170 associated with that user. The user may additionally acquire reward points for access to accounts, transactions, and other interaction using the authentication credential 170 associated with that user.

The provider aspects will now be discussed in greater detail. FIGS. 1, 5, and 7-8 highlight examples of the provider aspects, which may also be shown in other figures. Skilled artisans will appreciate that many providers may operate systems that differ from the provided example, and the discussion of any specific example is not intended to limit this disclosure to only that example.

An illustrative provider 130 may store account credentials 132 for the users subscribed to its services. This illustrative provider 130 may also perform authentication tasks, such as ensuring a user requesting access matches the credentials 132 stored by the provider 130 for that user. As an example, a media content delivery platform may include the usernames, passwords, and other information about the users that subscribe directly to the platform. Additionally, the provider 130 may include the content 134 that they deliver from the platform. Continuing with the example of the media content delivery platform, this may include the audio/visual works consumed by its subscribers.

The provider 130 may include account features 136 associated with its users, such as types of devices for which accesses permitted, quality of content permitted from the provider, transaction limits, and other information associated with a user and/or their account. The provider 130 may additionally include customer information 138 used by the provider. For example, a provider 130 may track usage statistics from its users, transaction history, preferences, personally identifying data, payment information, connected devices, additional authorized users on the account, and other information designated by a provider 130.

The provider 130 may include a communication component 140 to communicate data and information with users and/or other devices. For example, the provider 130 may communicate with the authentication server 110 through the communication component 140 of the provider 130 and the communication component 120 of the authentication server 110. In another example, the provider 130 may deliver its content to other subscribers through its communication component 140. This content delivery may be through an origin terminal 160 that may receive a credential index medium 170, a smart phone or other device belonging to the subscriber, or to another point of consumption designated by the provider 130.

Figure 2:
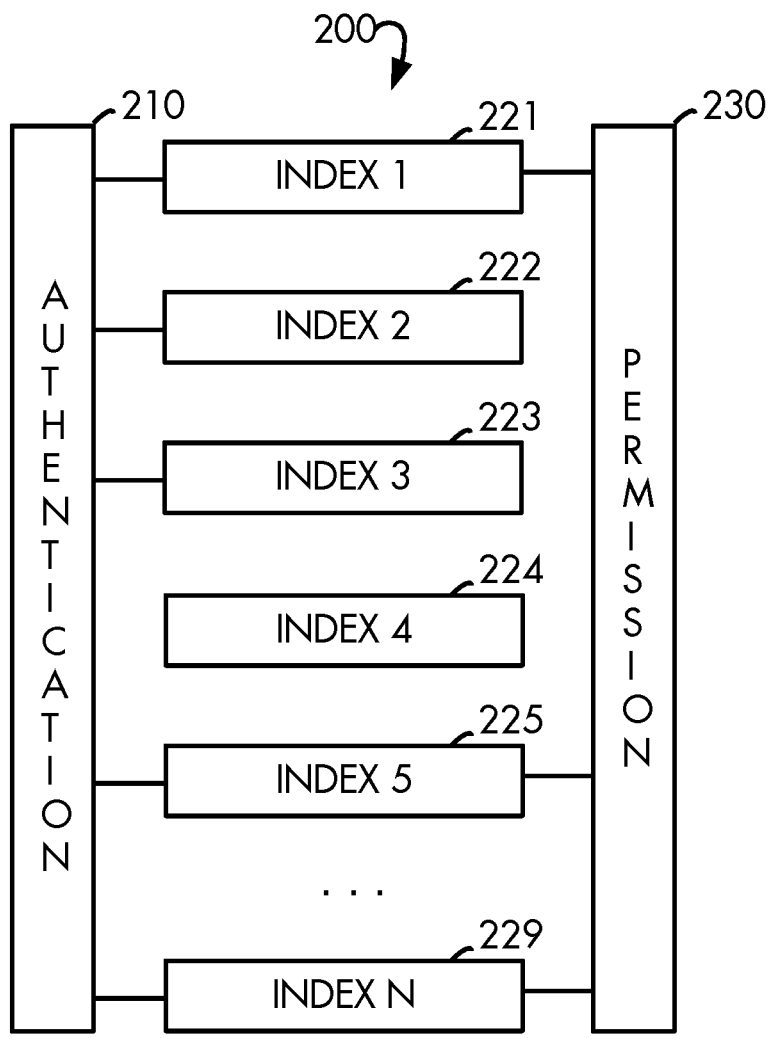
FIG. 2 is a block diagram view of an illustrative authentication and permissions aspect of the authentication system, according to an embodiment of this disclosure.

Referring now to FIG. 2, an illustrative authentication and provisioning operation will now be discussed in greater detail, without limitation. In this example shown by block diagram 200, multiple credential address indexes 221, 222, 223, 224, 225, 229 are shown associated with an authentication credential for a user. As discussed above, authentication 210 may relate to authorization of a user to access content or conduct transactions associated with the provider. Additionally, as discussed above, permissions 230 are associated with filtering of content associated with a credential address index, such as provided by the content filtering component. In one embodiment, authentication 210 may be at least partially performed by the provider.

In this example, a first request may be made for an authenticated session using a credential index medium associated with credential address index one 221. The request may comply with authentication requirements 210 for access to the provider and comply with permission requirements 230 to access the requested and authenticated content.

A second request may be made for an authenticated session using a credential index medium associated with credential address index two 222. The request may comply with authentication requirements 210 for access to the provider, but not comply with permission requirements 230 to access the requested and authenticated content.

A third request may be made for an authenticated session using a credential index medium associated with credential address index three 223. The request may comply with authentication requirements 210 for access to the provider, but not comply with permission requirements 230 to access the requested and authenticated content.

A fourth request may be made for an authenticated session using a credential index medium associated with credential address index four 224. The request may fail to comply with authentication requirements 210 for access to the provider, even though it would comply with permission requirements 230 to access the requested content if it had been authenticated.

A fifth request may be made for an authenticated session using a credential index medium associated with credential address index five 225. The request may comply with authentication requirements 210 for access to the provider and comply with permission requirements 230 to access the requested and authenticated content. Additional requests may be made for additional credential address indexes 229, as illustrated with the "Nth" index.

Referring now to block diagram 300 of FIG. 3, an illustrative credential index medium 310 will now be discussed in greater detail, without limitation. In this example the credential index medium 310 is presented as a card. However, those of skill in the art will appreciate alternative forms for credential index media. In this example, the credential index medium 310 may include branding as illustrated by the "ACCESS CARD" name. The credential index medium 310 may additionally include a credential address index 320 to an authentication credential. In this example, the credential address index 320 is provided as a 16-bit hexadecimal code. The credential address index 320 may alternatively be provided using an alphanumeric code; combination of letters, numbers, and/or symbols; magnetic strip; QR code; barcode; smart chip; wirelessly broadcasted data; RFID; or otherwise communicated identification.

Figure 4:
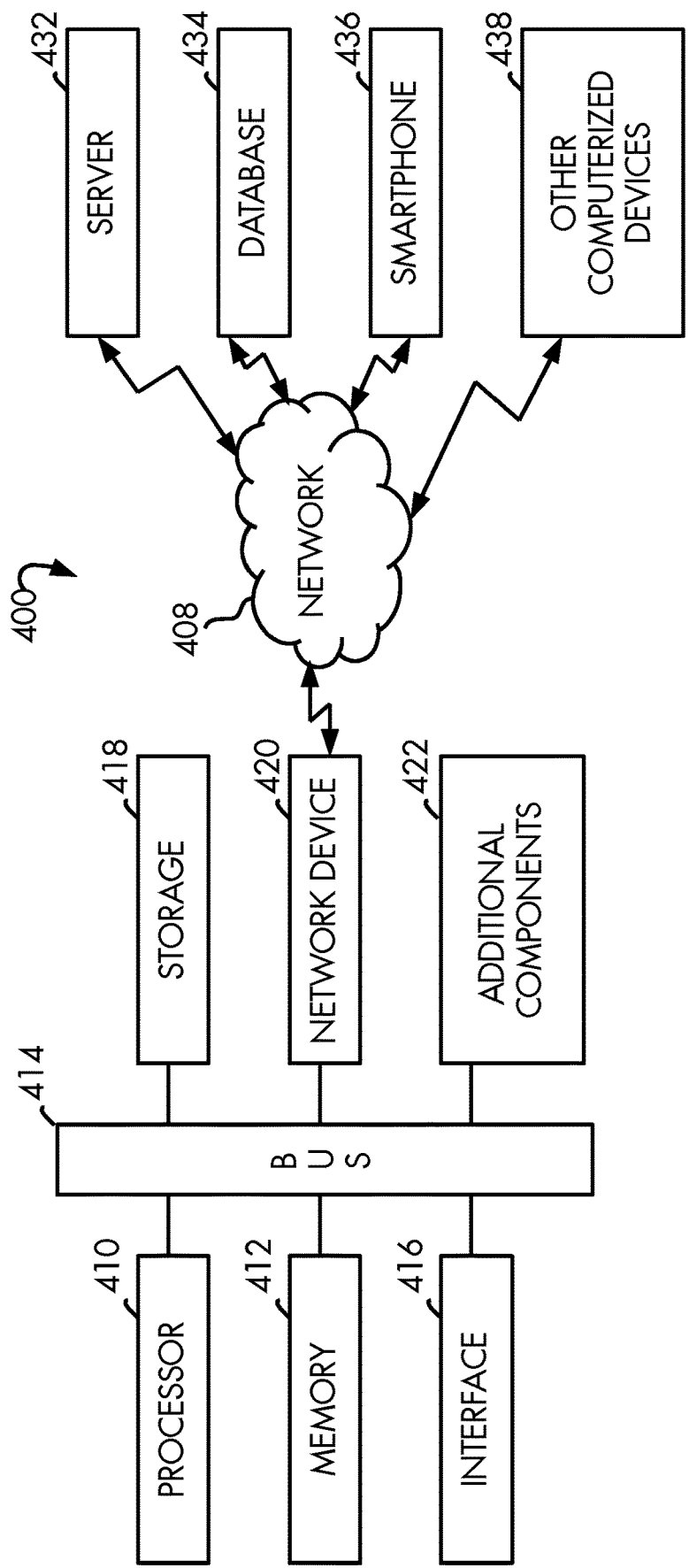
FIG. 4 is a block diagram view of an illustrative computerized device on which the system may be operated, according to an embodiment of this disclosure.

Referring now to FIG. 4, an illustrative computerized device will be discussed, without limitation. Various aspects and functions described in accord with the present disclosure may be implemented as hardware or software on one or more illustrative computerized devices 400 or other computerized devices. There are many examples of illustrative computerized devices 400 currently in use that may be suitable for implementing various aspects of the present disclosure. Some examples include, among others, network appliances, personal computers, workstations, mainframes, networked clients, servers, media servers, application servers, database servers and web servers. Other examples of illustrative computerized devices 400 may include mobile computing devices, cellular phones, smartphones, tablets, video game devices, personal digital assistants, network equipment, devices involved in commerce such as point of sale equipment and systems, such as handheld scanners, magnetic stripe readers, bar code scanners and their associated illustrative computerized device 400, among others. Additionally, aspects in accord with the present disclosure may be located on a single illustrative computerized device 400 or may be distributed among one or more illustrative computerized devices 400 connected to one or more communication networks.

For example, various aspects and functions may be distributed among one or more illustrative computerized devices 400 configured to provide a service to one or more client computers, or to perform an overall task as part of a distributed system. Additionally, aspects may be performed on a client-server or multi-tier system that includes components distributed among one or more server systems that perform various functions. Thus, the disclosure is not limited to executing on any particular system or group of systems. Further, aspects may be implemented in software, hardware or firmware, or any combination thereof. Thus, aspects in accord with the present disclosure may be implemented within methods, acts, systems, system elements and components using a variety of hardware and software configurations, and the disclosure is not limited to any particular distributed architecture, network, or communication protocol.

FIG. 4 shows a block diagram of an illustrative computerized device 400, in which various aspects and functions in accord with the present disclosure may be practiced. The illustrative computerized device 400 may include one or more illustrative computerized devices 400. The illustrative computerized devices 400 included by the illustrative computerized device may be interconnected by, and may exchange data through, a communication network 408. Data may be communicated via the illustrative computerized device using a wireless and/or wired network connection.

Network 408 may include any communication network through which illustrative computerized devices 400 may exchange data. To exchange data via network 408, systems and/or components of the illustrative computerized device 400 and the network 408 may use various methods, protocols and standards including, among others, Ethernet, Wi-Fi, Bluetooth, TCP/IP, UDP, HTTP, FTP, SNMP, SMS, MMS, SS7, JSON, XML, REST, SOAP, RMI, DCOM, and/or Web Services, without limitation. To ensure data transfer is secure, the systems and/or modules of the illustrative computerized device 400 may transmit data via the network 408 using a variety of security measures including TSL, SSL, or VPN, among other security techniques. The illustrative computerized device 400 may include any number of illustrative computerized devices 400 and/or components, which may be networked using virtually any medium and communication protocol or combination of protocols.

Various aspects and functions in accord with the present disclosure may be implemented as specialized hardware or software executing in one or more illustrative computerized devices 400, including an illustrative computerized device 400 shown in FIG. 4. As depicted, the illustrative computerized device 400 may include a processor 410, memory 412, a bus 414 or other internal communication system, an input/output (I/O) interface 416, a storage system 418, and/or a network communication device 420. Additional devices 422 may be selectively connected to the computerized device via the bus 414. Processor 410, which may include one or more microprocessors or other types of controllers, can perform a series of instructions that result in manipulated data. Processor 410 may be a commercially available processor such as an ARM, x86, Intel Core, Intel Pentium, Motorola PowerPC, SGI MIPS, Sun UltraSPARC, or Hewlett-Packard PA-RISC processor, but may be any type of processor or controller as many other processors and controllers are available. As shown, processor 410 may be connected to other system elements, including a memory 412, by bus 414.

The illustrative computerized device 400 may also include a network communication device 420. The network communication device 420 may receive data from other components of the computerized device to be communicated with servers 432, databases 434, smart phones 436, and/or other computerized devices 438 via a network 408. The communication of data may optionally be performed wirelessly. More specifically, without limitation, the network communication device 420 may communicate and relay information from one or more components of the illustrative computerized device 400, or other devices and/or components connected to the computerized device 400, to additional connected devices 432, 434, 436, and/or 438. Connected devices are intended to include, without limitation, data servers, additional computerized devices, mobile computing devices, smart phones, tablet computers, and other electronic devices that may communicate digitally with another device. In one example, the illustrative computerized device 400 may be used as a server to analyze and communicate data between connected devices.

The illustrative computerized device 400 may communicate with one or more connected devices via a communications network 408. The computerized device 400 may communicate over the network 408 by using its network communication device 420. More specifically, the network communication device 420 of the computerized device 400 may communicate with the network communication devices or network controllers of the connected devices. The network 408 may be, for example, the internet. As another example, the network 408 may be a WLAN. However, skilled artisans will appreciate additional networks to be included within the scope of this disclosure, such as intranets, local area networks, wide area networks, peer-to-peer networks, and various other network formats. Additionally, the illustrative computerized device 400 and/or connected devices 432, 434, 436, and/or 438 may communicate over the network 408 via a wired, wireless, or other connection, without limitation.

Memory 412 may be used for storing programs and/or data during operation of the illustrative computerized device 400. Thus, memory 412 may be a relatively high performance, volatile, random access memory such as a dynamic random-access memory (DRAM) or static memory (SRAM). However, memory 412 may include any device for storing data, such as a disk drive or other non-volatile storage device. Various embodiments in accord with the present disclosure can organize memory 412 into particularized and, in some cases, unique structures to perform the aspects and functions of this disclosure.

Components of illustrative computerized device 400 may be coupled by an interconnection element such as bus 414. Bus 414 may include one or more physical busses (for example, busses between components that are integrated within a same machine), but may include any communication coupling between system elements including specialized or standard computing bus technologies such as USB, Thunderbolt, SATA, FireWire, IDE, SCSI, PCI and InfiniBand. Thus, bus 414 may enable communications (for example, data and instructions) to be exchanged between system components of the illustrative computerized device 400.

The illustrative computerized device 400 also may include one or more interface devices 416 such as input devices, output devices and combination input/output devices. Interface devices 416 may receive input or provide output. More particularly, output devices may render information for external presentation. Input devices may accept information from external sources. Examples of interface devices include, among others, keyboards, bar code scanners, mouse devices, trackballs, magnetic strip readers, microphones, touch screens, printing devices, display screens, speakers, network interface cards, etc. The interface devices 416 allow the illustrative computerized device 400 to exchange information and communicate with external entities, such as users and other systems.

Storage system 418 may include a computer readable and writeable nonvolatile storage medium in which instructions can be stored that define a program to be executed by the processor. Storage system 418 also may include information that is recorded, on or in, the medium, and this information may be processed by the program. More specifically, the information may be stored in one or more data structures specifically configured to conserve storage space or increase data exchange performance. The instructions may be persistently stored as encoded bits or signals, and the instructions may cause a processor to perform any of the functions described by the encoded bits or signals. The medium may, for example, be optical disk, magnetic disk or flash memory, among others. In operation, processor 410 or some other controller may cause data to be read from the nonvolatile recording medium into another memory, such as the memory 412, that allows for faster access to the information by the processor than does the storage medium included in the storage system 418. The memory may be located in storage system 418 or in memory 412. Processor 410 may manipulate the data within memory 412, and then copy the data to the medium associated with the storage system 418 after processing is completed. A variety of components may manage data movement between the medium and integrated circuit memory element and does not limit the disclosure. Further, the disclosure is not limited to a particular memory system or storage system.

Although the above described illustrative computerized device is shown by way of example as one type of illustrative computerized device upon which various aspects and functions in accord with the present disclosure may be practiced, aspects of the disclosure are not limited to being implemented on the illustrative computerized device 400 as shown in FIG. 4. Various aspects and functions in accord with the present disclosure may be practiced on one or more computers having components than that shown in FIG. 4. For instance, the illustrative computerized device 400 may include specially-programmed, special-purpose hardware, such as for example, an application-specific integrated circuit (ASIC) tailored to perform a particular operation disclosed in this example. While another embodiment may perform essentially the same function using several general-purpose computing devices running Windows, Linux, Unix, Android, iOS, MAC OS X, or other operating systems on the aforementioned processors and/or specialized computing devices running proprietary hardware and operating systems. In additional embodiments, an interface or other software system may be operated as a layer on top of the operating system, for example, in point-of-sale (PoS) deployments, kiosks, embedded devices, displays incorporated into physical devices, internet-of-things (IoT) devices, restricted access interfaces, and/or other interfaces or systems that would be apparent to a person of skill in the art after having the benefit of this disclosure.

The illustrative computerized device 400 may include an operating system that manages at least a portion of the hardware elements included in illustrative computerized device 400. A processor or controller, such as processor 410, may execute an operating system which may be, among others, an operating system, one of the above-mentioned operating systems, one of many Linux-based operating system distributions, a UNIX operating system, or another operating system that would be apparent to skilled artisans. Many other operating systems may be used, and embodiments are not limited to any particular operating system.

The processor and operating system may work together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, aspects in accord with the present disclosure may be implemented using an object-oriented programming language, such as JAVA, C, C++, C#, Python, PHP, Visual Basic .NET, JavaScript, Perl, Ruby, Delphi/Object Pascal, Visual Basic, Objective-C, Swift, MATLAB, PL/SQL, OpenEdge ABL, R, Fortran or other languages that would be apparent to skilled artisans. Other object-oriented programming languages may also be used. Alternatively, assembly, procedural, scripting, or logical programming languages may be used.

Additionally, various aspects and functions in accord with the present disclosure may be implemented in a non-programmed environment (for example, documents created in HTML5, HTML, XML, CSS, JavaScript, or other format that, when viewed in a window of a browser program, render aspects of a graphical-user interface or perform other functions). Further, various embodiments in accord with the present disclosure may be implemented as programmed or non-programmed elements, or any combination thereof. For example, a web page may be implemented using HTML while a data object called from within the web page may be written in C++. Thus, the disclosure is not limited to a specific programming language and any suitable programming language could also be used.

An illustrative computerized device included within an embodiment may perform functions outside the scope of the disclosure. For instance, aspects of the system may be implemented using an existing commercial product, such as, for example, Database Management Systems such as a SQL Server available from Microsoft of Redmond, Wash., Oracle Database or MySQL from Oracle of Redwood City, Calif., or integration software such as WebSphere middleware from IBM of Armonk, N.Y.

In operation, a method may be provided for authenticating users across multiple sessions. Those of skill in the art will appreciate that the following methods are provided to illustrate an embodiment of the disclosure and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

Referring now to block diagram 500 of FIG. 5, an illustrative organization structure for an access request using the authentication system will be described, without limitation. An access request may be received at an origin terminal 560. This access request may include a credential address index. The access request may be communicated to the provider 530 with the credential address index. The provider 530 may receive the access request including the credential address index and access an account for the user.

The provider 530 may then request authentication of the user with the authentication server 510. In response to the request from the provider 530, the authentication server 510 may access the record associated with the authentication credential of the user identified by the credential address index in the credential database. The authentication servers 510 may additionally compare the access request with the scope of permissions in the record to determine compliance with a request condition, examples of such being given above.

The authentication server 510 may return an authentication credential permitting the access request that is compliant with the request condition to the provider 530. This step may include acknowledgement by the authentication server 510 that the authentication credential permits access to an authorized session. The authentication server may confirm with the provider 530 that access to the requested session is permitted. The provider 530 may then provide the requested services to the user in the authorized session, which may be received by the origin terminal 560.

In one embodiment, authentication server 510 may validate an authorized session with the provider 530 to be indicated by an authentication credential. This validated authorized session may permit a persistent login, such as may be associated with a cookie demonstrating valid login credentials for the provider 530. In this embodiment, upon authenticating the user by the authentication server 510, the authentication server 510 may validate the user to the provider 530 to access the services provided by the authorized session that is maintained. For example, the user may connect to an already logged in authorized session validated by the authentication server 510 and transfer the right to access the authorized session to any origin terminal 560 able to confirm a valid authentication credential from the authentication server 510.

Additionally, in this example, the authentication credential index may be associated with the credential index medium that is eligible for association, such that an authentication credential located using the credential index medium allowing for access to a validated authorized session. Additionally, the authentication credential index may be disassociated with the credential index medium that is identified for disassociation. Association and disassociation of an authentication credential index with credential index media may be managed by the user without affecting a state of the authentication credential and authorized session indicated by the authentication credential. For example, a user can alter permissions for an authentication address index to remove access to an authentication credential from a credential index medium without requiring the authentication server 510 to disengage the provider 530.

Figure 6:
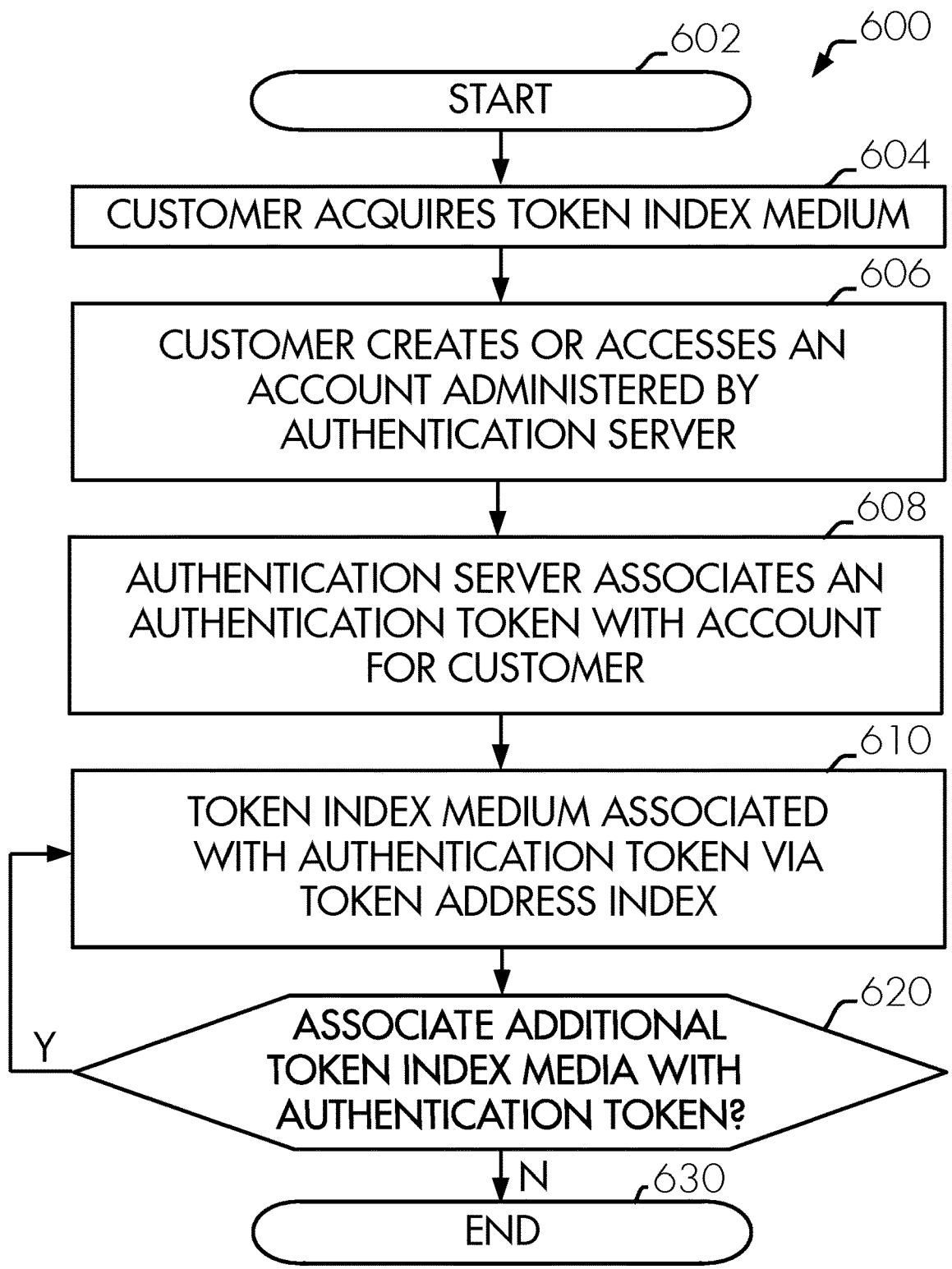
FIG. 6 is a flowchart view of an illustrative initialization of the authentication system, according to an embodiment of this disclosure.

Referring now to flowchart 600 of FIG. 6, an illustrative method for an initialization of the authentication system will be described, without limitation. Starting with Block 602, the operation may begin by a customer acquiring a credential index medium. (Block 604). The customer then may create and/or access an account administered by the authentication server of the indexable authentication system of this disclosure. (Block 606). The authentication server may associate an authentication credential with the account for the user or customer. (Block 608). A credential address index may be associated with the credential index medium and the authentication credential for the user. A credential index medium may be associated with the authentication credential via an index. (Block 610).

It may then be determined at Block 620 whether the user desires to associate an additional credential index medium with the authentication credential. The additional credential index medium may include a credential address index with permissions that differ from the credential address index of another credential index medium.

If it is decided at Block 620 that the user desires to associate an additional credential index medium with the authentication credential, the operation may return to the Block 610 and define one or more additional indexes to associate with several desired additional credential index media. These additional credential index media may share the authentication credential associated with the initial credential index medium but may be assigned different permissions as the user may desire. If it is decided at Block 620 that the user does not desire to associate any additional credential index media with their authentication credential, the operation may end at Block 630.

Figure 7:
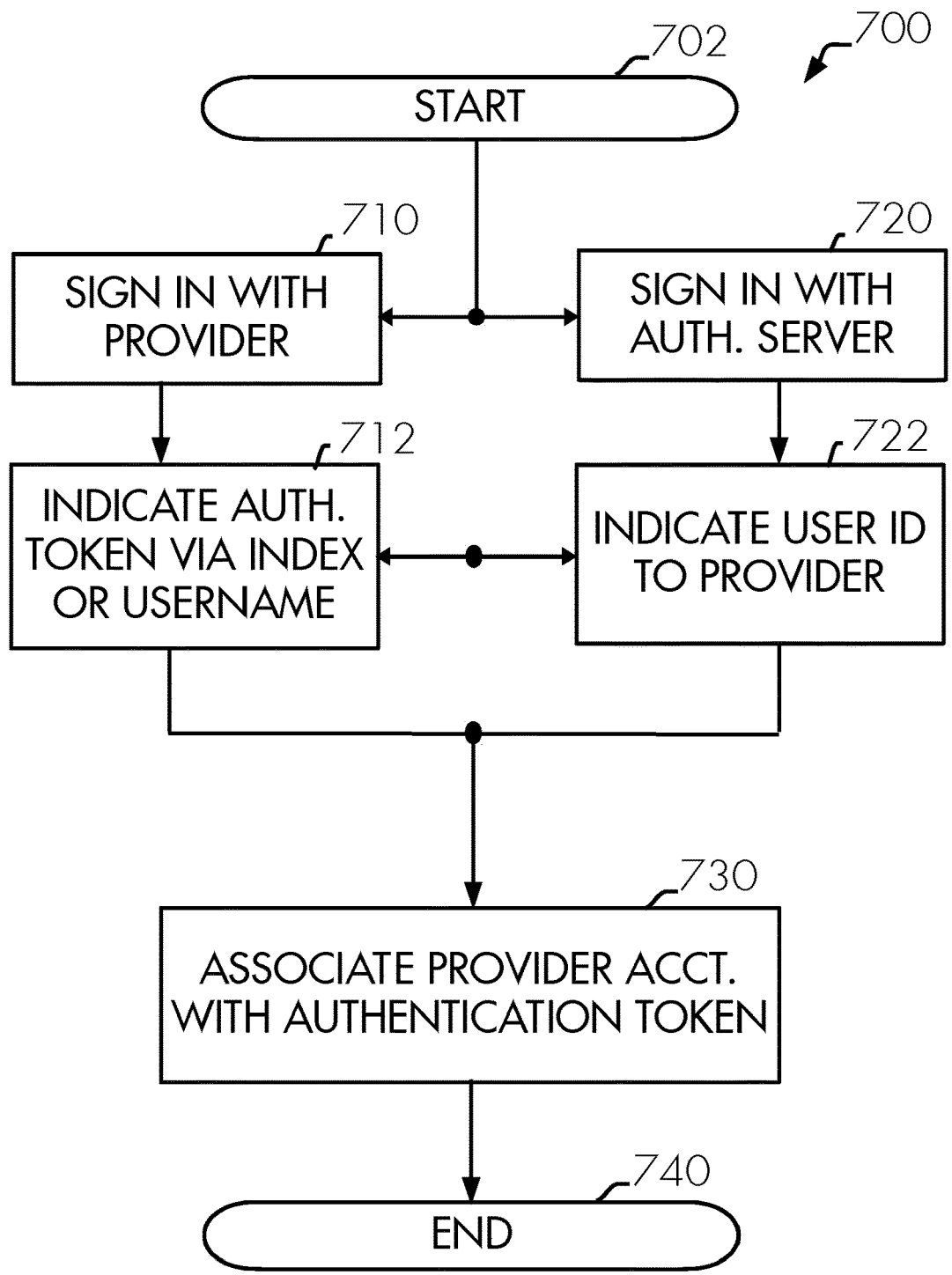
FIG. 7 is a flowchart view of an illustrative operation relating to account pairing, according to an embodiment of this disclosure.

Referring now to flowchart 700 of FIG. 7, an illustrative method for an operation relating to account pairing will be described, without limitation. Starting with Block 702, the operation may begin by the user accessing their accounts with the provider and the authentication server. It may not matter the order in which the user accesses their accounts.

Regarding the provider account, the user may sign into their account with the provider. (Block 710). The user may additionally indicate an authentication credential to associate with their provider account via an index and/or username. (Block 712). Regarding the authentication server, the user may sign into the account with the authentication server. (Block 720). The user may then indicate an identifier to the provider account. (Block 722). After the operations in Block 712 or Block 722 are complete, the user may associate the provider account with the authentication credential. (Block 730). The operation may then end at Block 740.

Figure 8:
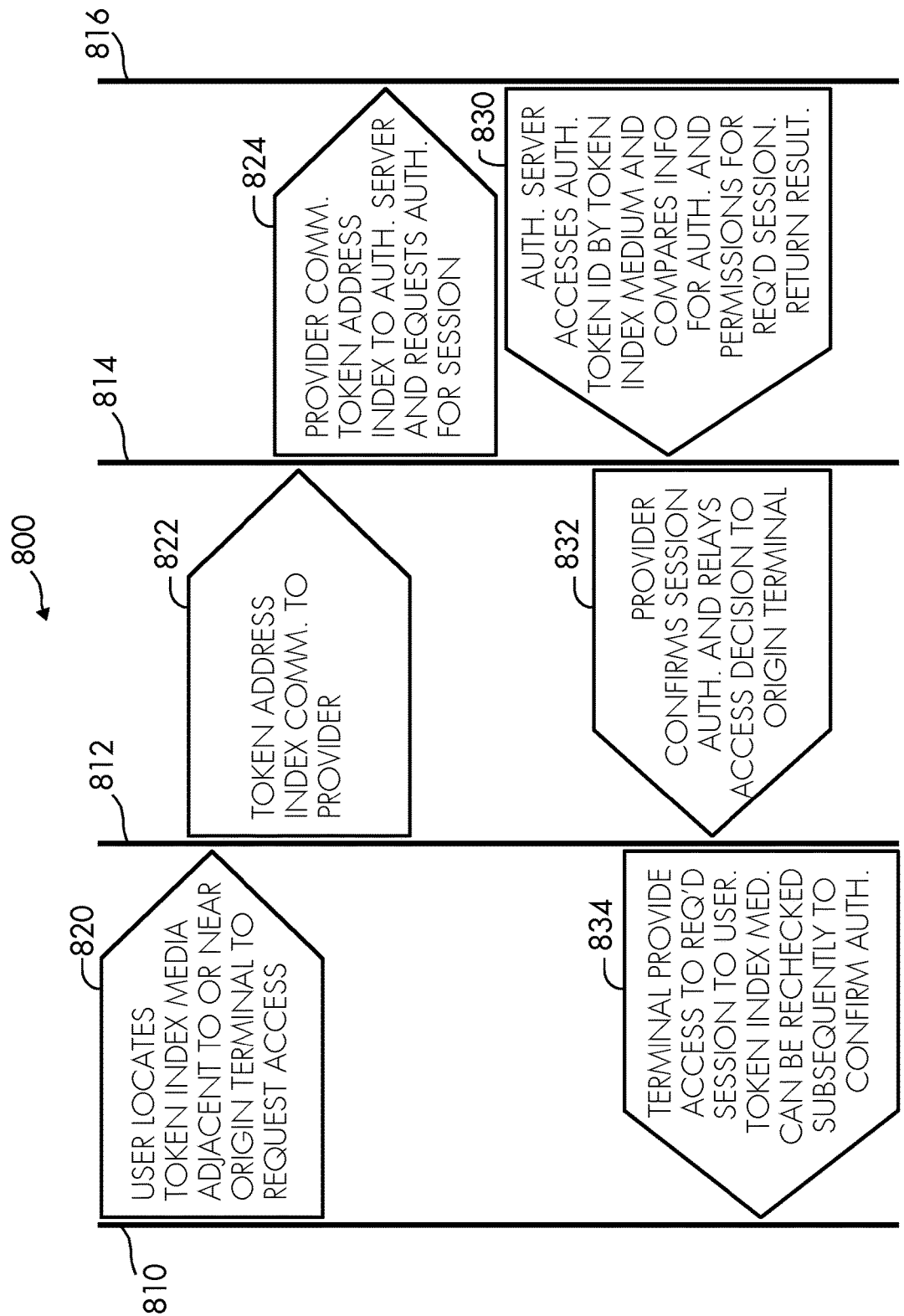
FIG. 8 is a flowchart view of an illustrative operation relating to authentication of a user for a requested session from a provider, according to an embodiment of this disclosure.

Referring now to flowchart 800 of FIG. 8, an illustrative method for an operation relating to authentication of a user for a requested session from a provider will be described, without limitation. In this illustrative operation, a request may be shared between a user 810, an origin terminal 812, a provider 814, and an authentication server 816. The operation may begin by the user 810 locating their credential index medium adjacent to or near the origin terminal 812 to request access to a service from the provider 814. (Block 820). The origin terminal 814 may then receive the credential address index from the credential index medium and communicate it to the provider 814. (Block 822). The provider 814 may then communicate the token index to the authentication server 816 and request authentication for the session. (Block 824).

The authentication server 816 may access an authentication credential associated with the credential address index identified by the credential index medium and compare information associated with the authentication credential for authorization and permissions related to the requested session. (Block 830). The result of this comparison may be returned to the provider 814. The provider 814 may then confirm whether authentication should be permitted for the session and relay the access decision to the origin terminal 812. (Block 832). The origin terminal 812 may then provide access to the session if the user 810 is authenticated and permitted to access the content. (Block 834). The origin terminal 812 may alternatively deny access to the session if the user 810 was not authenticated or lacks sufficient permissions. The origin terminal 812 may subsequently check to confirm continued access to the authenticated user 810, for example, determining whether the credential index medium used to request the session is still present. The operation may then end.

Figure 9:
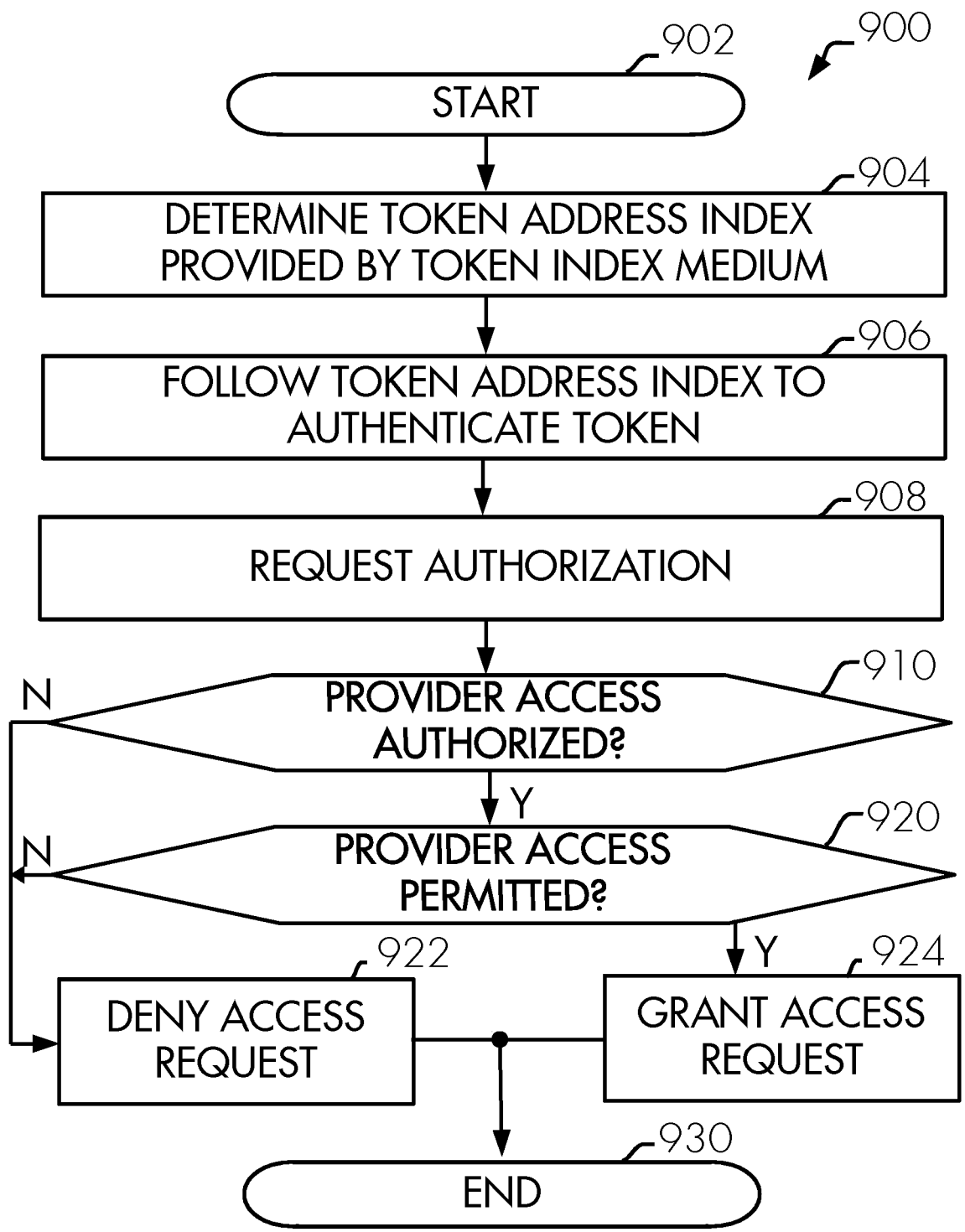
FIG. 9 is a flowchart view of an illustrative session authentication operation with permission determination, according to an embodiment of this disclosure.

Referring now to flowchart 900 of FIG. 9, an illustrative method for an illustrative session authentication operation with permission determination will be described, without limitation. Starting with Block 902, the operation may begin by determining a credential address index provided by a credential index medium. (Block 904) The credential address index may then be followed to access the authentication credential identified by the index. (Block 906). Authorization may be requested for a session as an access request. (Block 908).

It may then be determined at Block 910 if the user is authorized by the authentication credential to access the content delivered by the provider. The provider and/or the authentication server may make this determination. If it is determined at Block 910 that the user is not authorized, the access request may be denied. (Block 922) The operation may then end at Block 930. If it is determined at Block 910 that the user is authorized, it may be determined at Block 920 if the user is permitted to access the provider session with respect to the index making the access request.

If it is determined at Block 920 that the user is not permitted, the access request may be denied. (Block 922). The operation may then end at Block 930. If it is determined at Block 930 that the user is permitted, the access request may be granted. (Block 924). The operation may then end at Block 930.

While various aspects have been described in the above disclosure, the description of this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. An authentication system comprising: an authentication server operated on a computerized device comprising a processor and a storage medium storing instructions operable, when executed by the computerized device, to cause one or more computers to authenticate and determine a scope of permissions relating to an access request for services; a credential database communicably connected to the authentication server having a record relating to a user, the record comprising permissions; an authentication credential associated with the user and linking at least part of the record for the user with a provider; a credential index medium to facilitate access to the authentication credential via a credential address index; wherein the authentication server validates the access request by performing the steps comprising: (a) receiving the access request comprising the credential address index, (b) accessing the record associated with the authentication credential of the user identified by the credential address index in the credential database, (c) comparing the access request with the scope of permissions in the record to determine compliance with a request condition, the access request in compliance with the request condition being directed to the provider to determine whether the request will be granted, and (d) returning the authentication credential permitting the access request that is compliant with the request condition and granted by the provider; wherein the authentication credential is identified from the credential index medium by performing the steps comprising: (e) accessing the credential address index from the credential index medium at an origin terminal remote to the authentication server, (f) requesting the authentication server to access the authentication credential indicated by the credential address index, (g) validating the access request with the authentication server, and (h) returning the authentication credential indicated by the access request if validated; wherein the scope of permissions in the record is customizable; wherein the credential address index identifies and is distinguishable from the authentication credential; wherein the services granted access are at least partially filterable to comply with the scope of permissions; and wherein entry into a space restricted by an electronically-controllable lock is includable in the access request; wherein access to the space is includable in the permissions; and wherein unlocking the electronically-controllable lock is permittable by the authentication credential.

2. The system of claim 1: wherein the authentication server validates an authorized session with the provider as indicated by the authentication credential; and wherein upon authenticating the user by the authentication server, the authentication server validates the user to the provider for access the services provided by the authorized session.

3. The system of claim 2: wherein the authentication credential index is associable with the credential index medium that is eligible for association, such that the authentication credential that is associated is locatable using the credential index medium; wherein the authentication credential index is disassociable with the credential index medium that is identified for disassociation; and wherein association and disassociation of the authentication credential index with credential index media is managed by the user without affecting a state of the authentication credential and authorized session indicated by the authentication credential.

4. The system of claim 1, wherein the credential address index is a pointer to at least the authentication credential.

5. The system of claim 1, wherein the record comprises the authentication credential.

6. The system of claim 1, wherein the user is associable with sub-users; and wherein the scope of permissions is manipulable for each of the sub-users as definable by the user.

7. The system of claim 1, wherein interaction with a physical interface is includable in the permissions.

8. The system of claim 1, wherein the services subject to the access request are at least partially filterable to permit the access limited by levels of access; wherein the services are at least partly limited respective to the levels of access; and wherein features of the services are independently, selectively permitted or denied as defined by the levels of access within the scope of permissions.

9. The system of claim 8, wherein the levels of access are filterable regarding at least the following selectively permitted scope of permissions: access to the services; restrictions on content consumable through the services; and timed exclusions regarding the access to the services.

10. The system of claim 1, further comprising: a rewards component to track activity and determine incentives for engaging with the authentication server and/or the services that are compliant with the request condition.

11. The system of claim 1, wherein the credential index medium is providable as a tangible object.

12. The system of claim 1, wherein the credential index medium is providable as a virtual card carried electronically.

13. The system of claim 1, wherein the credential address index is associable with multiple credential index media substantially simultaneously.

14. An authentication system comprising: an authentication server operated on a computerized device comprising a processor and a storage medium storing instructions operable, when executed by the computerized device, to cause one or more computers to authenticate and determine a scope of permissions relating to an access request for services; a credential database communicably connected to the authentication server having a record relating to a user, the record comprising permissions; an authentication credential associated with the user and linking at least part of the record for the user with a provider; a credential index medium to facilitate access to the authentication credential via a credential address index; wherein the authentication server validates the access request by performing the steps comprising: (a) receiving the access request comprising the credential address index from the provider, (b) accessing the record associated with the authentication credential of the user identified by the credential address index in the credential database, (c) comparing the access request with the scope of permissions in the record to determine compliance with a request condition, the access request in compliance with the request condition being directed to the provider to determine whether the request will be granted, and (d) returning the authentication credential permitting the access request that is compliant with the request condition and granted by the provider; wherein the authentication credential is identified from the credential index medium by performing the steps comprising: (e) accessing the credential address index from the credential index medium at an origin terminal remote to the authentication server, (f) requesting the authentication server to access the authentication credential indicated by the credential address index, (g) validating the access request by the authentication server, and (h) returning the authentication credential indicated by the access request if available to the provider; wherein the authentication server validates an authorized session with the provider to be indicated by the authentication credential; wherein upon authenticating the user by the authentication server, the authentication server validates the user to the provider to access the services provided by the authorized session; wherein the authentication credential index is associable with the credential index medium that is eligible for association, such that the authentication credential that is associated is locatable using the credential index medium; wherein the authentication credential index is disassociable with the credential index medium that is identified for disassociation; wherein association and disassociation of the authentication credential index with credential index media is managed by the user without affecting a state of the authentication credential and authorized session indicated by the authentication credential; wherein the credential address index identifies and is distinguishable from the authentication credential; wherein the scope of permissions in the record is customizable; and wherein entry into a space restricted by an electronically-controllable lock is includable in the access request; wherein access to the space is includable in the permissions; and wherein unlocking the electronically-controllable lock is permittable by the authentication credential.

15. The system of claim 14: wherein the services granted access are at least partially filterable to comply with the scope of permissions; wherein the services subject to the access request are at least partially filterable to permit the access limited by levels of access; and wherein the services are at least partly limited respective to the scope of permissions.

16. A method for authenticating a session comprising: (a) determining a scope of permissions to authenticate an access request for services using an authentication server; (b) accessing a record relating to a user from a credential database communicably connected to the authentication server, the record comprising permissions; (c) managing an authentication credential associated with the user and linking at least part of the record for the user with a provider; (d) facilitating access to the authentication credential via a credential address index provided by a credential index medium; (e) validating the access request via the authentication server by performing the steps comprising: (i) receiving the access request comprising the credential address index, (ii) accessing the record associated with the authentication credential of the user identified by the credential address index in the credential database, (iii) comparing the access request with the scope of permissions in the record to determine compliance with a request condition, the access request in compliance with the request condition being directed to the provider to determine whether the request will be granted, and (iv) returning the authentication credential permitting the access request that is compliant with the request condition and granted by the provider; (f) identifying the authentication credential from the credential index medium by performing the steps comprising: (i) accessing the credential address index from the credential index medium at an origin terminal remote to the authentication server, (ii) requesting the authentication server to access the authentication credential indicated by the credential address index, (iii) validating the access request by the authentication server, and (iv) returning the authentication credential indicated by the access request if validated; wherein the scope of permissions in the record is customizable; wherein the credential address index identifies and is distinguishable from the authentication credential; wherein the services granted access are at least partially filterable to comply with the scope of permissions; and wherein entry into a space restricted by an electronically-controllable lock is includable in the access request; wherein access to the space is includable in the permissions; and wherein unlocking the electronically-controllable lock is permittable by the authentication credential.

17. The method of claim 16: wherein the authentication server validates an authorized session with the provider to be indicated by the authentication credential; and wherein upon authenticating the user by the authentication server, the authentication server validates the user to the provider to access the services provided by the authorized session through the provider; the method further comprising the steps: (g) associating the authentication credential index with the credential index medium that is eligible for association, such that the authentication credential that is associated is locatable using the credential index medium, and (h) disassociating the authentication credential index with the credential index medium that is identified for disassociation; and wherein association and disassociation of the authentication credential index with credential index media is managed by the user without affecting a state of the authentication credential and authenticated session.

18. The method of claim 16, further comprising the steps: (i) at least partially filtering the services subject to the access request to permit the access limited by levels of access, wherein the services are at least partly limited respective to the levels of access; and (j) independently, selectively permitting or denying features of the services as defined by the levels of access within the scope of permissions.

19. The method of claim 16, wherein the credential address index is associable with multiple credential index media substantially simultaneously.

\* \* \* \* \*